United States Patent
Fukuoka et al.

(10) Patent No.: US 6,893,621 B2
(45) Date of Patent: May 17, 2005

(54) LITHIUM-CONTAINING SILICON OXIDE POWDER AND MAKING METHOD

(75) Inventors: Hirofumi Fukuoka, Annaka (JP); Satoru Miyawaki, Annaka (JP); Mikio Aramata, Annaka (JP); Susumu Ueno, Annaka (JP); Kazuma Momii, Annaka (JP); Takeshi Fukuda, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 239 days.

(21) Appl. No.: 10/234,245

(22) Filed: Sep. 5, 2002

(65) Prior Publication Data

US 2003/0053945 A1 Mar. 20, 2003

(30) Foreign Application Priority Data

Sep. 5, 2001 (JP) .................................... 2001-268883
Sep. 28, 2001 (JP) .................................... 2001-299837

(51) Int. Cl.[7] ........................................... C01B 33/113
(52) U.S. Cl. ..................... 423/332; 423/337; 423/335; 429/218
(58) Field of Search ................. 423/335, 332, 423/337; 429/218

(56) References Cited

U.S. PATENT DOCUMENTS

| | | | |
|---|---|---|---|
| 5,395,711 A | 3/1995 | Tahara et al. ................ | 429/197 |
| 5,478,671 A | 12/1995 | Idota ........................... | 429/194 |
| 5,506,075 A * | 4/1996 | Iwasaki et al. ............. | 429/342 |
| 6,066,414 A | 5/2000 | Imoto et al. ............. | 429/218.1 |
| 6,083,644 A * | 7/2000 | Watanabe et al. ......... | 429/231.1 |
| 2001/0018037 A1 * | 8/2001 | Fukuoka et al. ............ | 423/335 |
| 2003/0129498 A1 * | 7/2003 | Tsukamoto ................. | 429/324 |

FOREIGN PATENT DOCUMENTS

| | | |
|---|---|---|
| EP | 0 582 173 A1 | 2/1994 |
| EP | 0 845 828 A1 | 6/1998 |
| JP | 5-174818 A | 7/1993 |
| JP | 6-60867 A | 3/1994 |
| JP | 10-64541 A | 3/1998 |
| JP | 10-294112 A | 11/1998 |
| JP | 11-102705 | 4/1999 |
| JP | 2997741 B2 | 11/1999 |

* cited by examiner

Primary Examiner—Ngoc-Yen Nguyen
(74) Attorney, Agent, or Firm—Birch, Stewart, Kolasch & Birch, LLP

(57) ABSTRACT

A lithium ion secondary cell having a high capacity, improved first charge/discharge efficiency and improved cycle performance is obtainable using as the negative electrode material a lithium-containing silicon oxide powder having the formula: $SiLi_xO_y$ wherein x and y are $0<x<1.0$ and $0<y<1.5$, with the lithium being fused and partially crystallized.

11 Claims, 3 Drawing Sheets

LITHIUM-CONTAINING SILICON OXIDE POWDER AND MAKING METHOD

This invention relates to a lithium-containing silicon oxide powder which is useful as a negative electrode active material in a lithium ion secondary cell, and a method for preparing the same.

BACKGROUND OF THE INVENTION

With the recent rapid progress of potable electronic equipment and communication equipment, secondary batteries having a high energy density are strongly desired from the standpoints of economy and size and weight reduction. Prior art known attempts for increasing the capacity of such secondary batteries include the use as the negative electrode material of oxides of V, Si, B, Zr, Sn or the like or compound oxides thereof (JP-A 5-174818, JP-A 6-60867 corresponding to U.S. Pat. No. 5,478,671), melt quenched metal oxides (JP-A 10-294112), silicon oxide (Japanese Patent No. 2,997,741 corresponding to U.S. Pat. No. 5,395,711), and $Si_2N_2O$ or $Ge_2N_2O$ (JP-A 11-102705 corresponding to U.S. Pat. No. 6,066,414).

These prior art methods are successful in increasing the charge/discharge capacity and the energy density of secondary batteries, but fall short of the market demand partially because of unsatisfactory cycle performance. There is a demand for further improvement in energy density.

Japanese Patent No. 2,997,741 describes lithium-containing silicon oxide as the negative electrode material in a lithium ion secondary cell. As long as the present inventors have empirically confirmed, the performance of this cell is yet unsatisfactory due to an increased irreversible capacity on the first charge/discharge cycle. It is not definitely described how to prepare the lithium-containing silicon oxide.

SUMMARY OF THE INVENTION

An object of the invention is to provide a lithium-containing silicon oxide powder which is useful as the negative electrode material to construct a lithium ion secondary cell having a high capacity with no cycling loss and a reduced irreversible capacity on the first charge/discharge cycle. Another object is to provide a method for preparing the lithium-containing silicon oxide powder.

Making extensive investigations on silicon compounds which are deemed to potentially provide a high capacity, the inventors have found that when a material obtained by previously introducing lithium into a negative electrode active material, that is, a lithium-containing silicon oxide powder having the general formula: $SiLi_xO_y$ in which lithium has been fused and partially crystallized is used as a negative electrode material, there is obtained a lithium ion secondary cell capable of maintaining a high capacity with no cycling loss and having a reduced irreversible capacity on the first charge/discharge cycle.

In one aspect, the invention provides a lithium-containing silicon oxide powder having the general formula: $SiLi_xO_y$ wherein x and y are $0<x<1.0$ and $0<y<1.5$, the lithium being fused and partially crystallized.

In another aspect, the invention provides a method for preparing a lithium-containing silicon oxide powder, comprising the step of heating a mixture of a raw material powder capable of generating SiO gas and metallic lithium or a lithium compound in an inert gas atmosphere or in vacuum at a temperature of 800 to 1,300° C. for reaction.

DESCRIPTION OF THE PREFERRED EMBODIMENT

Figure 1:
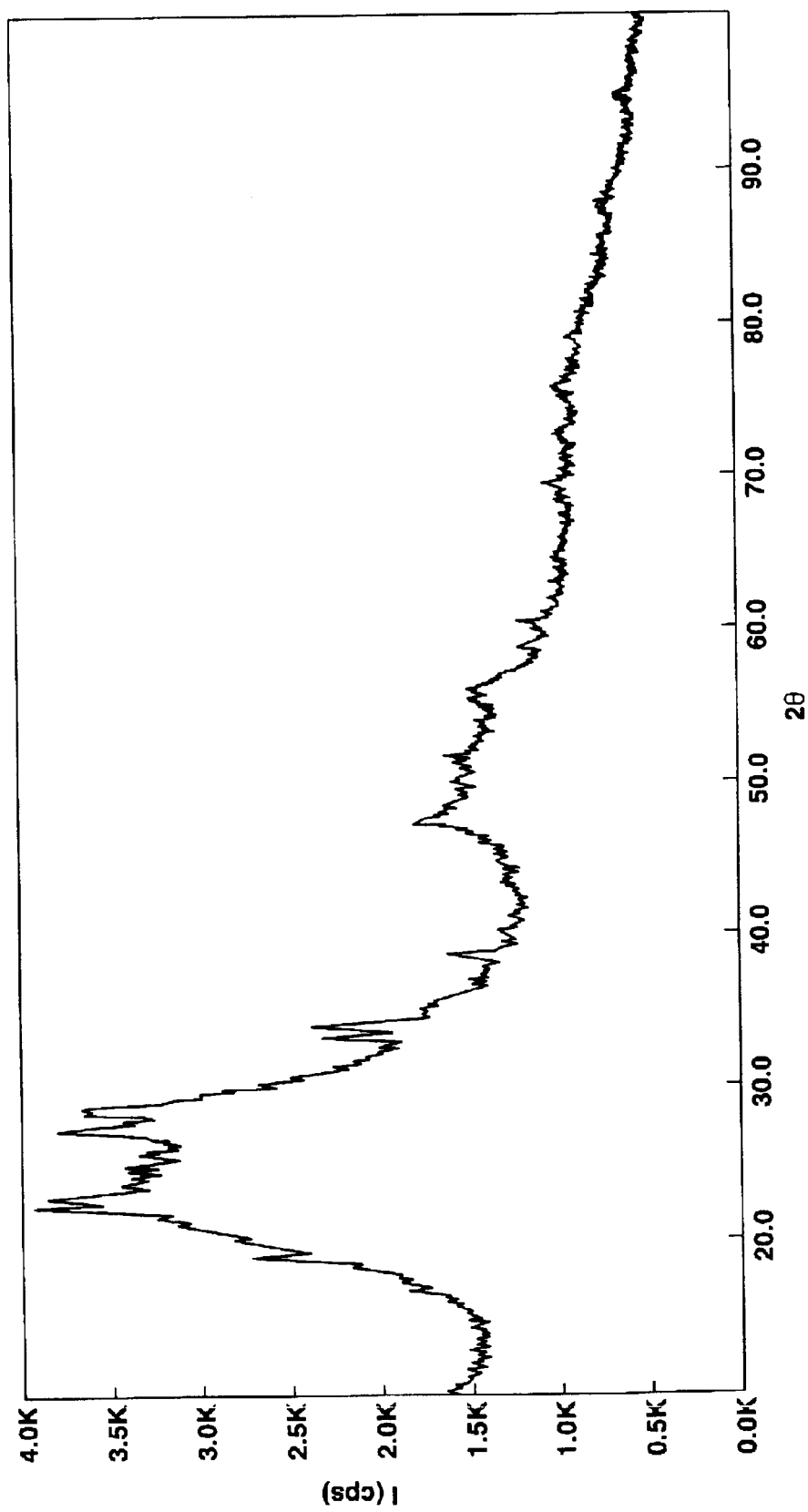
FIG. 1 is an x-ray diffraction chart of a lithium-containing silicon oxide powder (Li crystallization 8.3%) obtained in Example 1.

The lithium-containing silicon oxide powder of the invention having the general formula: $SiLi_xO_y$ is used as a negative electrode material to construct a lithium ion secondary cell having a high capacity and experiencing no cycling loss.

In the formula: $SiLi_xO_y$, x has a value in the range: $0<x<1.0$ and preferably $0.05 \leq x \leq 0.6$. If x is equal to 0, it means the elimination of the doping of silicon oxide with lithium characterizing the present invention, and the advantages of the invention are not available. Inversely, if x is more than 1.0, it means a reduced content of silicon in the negative electrode active material, resulting in a cell exhibiting a reduced discharge capacity per unit weight despite a reduced irreversible capacity on the first charge/discharge cycle.

In the formula, y has a value in the range: $0<y<1.5$ and preferably $0.3 \leq y \leq 1.0$. If y is equal to 0, the cycle performance declines. Inversely, if y is more than 1.5, a lithium ion secondary cell having a high capacity is not available.

It is noted that the values of x and y in $SiLi_xO_y$ are defined as being determined by molar conversion from an Li content as measured by wet decomposition ICP emission spectrometry and an oxygen content as measured and quantitated by an in-ceramic oxygen analyzer (inert gas fusion method), respectively.

In the lithium-containing silicon oxide powder of the invention, lithium is fused and partially crystallized. The phrase that lithium is fused (that is, lithium is fused with silicon oxide $SiO_z$) means that silicon oxide is doped with lithium to form lithium silicon oxide, which is deemed to take a crystalline or amorphous state. It is requisite for the present invention that part of the lithium silicon oxide be crystallized. As to the definition of the proportion (weight % or mole %) of crystallized lithium relative to the entire lithium fused as lithium silicon oxide, the proportion of the intensity of a diffraction line appearing at $2\theta=28.3°$ upon x-ray diffraction analysis (CuKα ray) on the product (lithium-containing silicon oxide) relative to the intensity (100%) of a diffraction line appearing at $2\theta=28.3°$ upon x-ray diffraction analysis (CuKα ray) on monocrystalline silicon is a percent crystallization. The range of percent crystallization is generally 0%<percent crystallization$\leq$~50% and preferably ~5%$\leq$percent crystallization$\leq$~30%. If the percent crystallization is 0%, the advantages of the invention are not available. If the percent crystallization is more than 50%, a lithium ion secondary cell having a high capacity is not always obtained. The reason why the partially crystallized lithium-containing silicon oxide powder is effective is not well understood. Although the invention is not bound to the theory, it is presumed that the use of such a silicon oxide having lithium fused and partially crystallized as the negative electrode material restrains the negative electrode material from being disrupted or finely divided by doping and dedoping of lithium ions. It is also presumed that the initial irreversible capacity can be reduced since lithium has been previously doped within the negative electrode material.

No particular limit is imposed on the physical properties of the lithium-containing silicon oxide powder of the invention. The powder preferably has a BET specific surface area of 0.5 to 50 m$^2$/g, and more preferably 1 to 30 m$^2$/g. A specific surface area of less than 0.5 m$^2$/g indicates a lower surface activity, with difficulties in fabricating a lithium ion secondary cell having a high capacity. Inversely, a powder with a specific surface area of more than 50 m$^2$/g may be difficult to handle during electrode manufacture. It is noted that the specific surface area is measured by the BET single-point method relying on nitrogen gas adsorption.

Also preferably, the lithium-containing silicon oxide powder of the invention has an average particle diameter $D_{50}$ of 0.5 to 100 μm, and especially 1 to 50 μm. A powder with a $D_{50}$ of less than 0.5 μm may be difficult to handle, leading to inefficient working. Powder particles with a $D_{50}$ of more than 100 μm are often larger than the thickness of an electrode film, with difficulties of electrode manufacture. It is noted that the average particle diameter $D_{50}$ is determined as a median diameter (particle diameter at 50% by weight cumulative) upon measurement of particle size distribution by laser light diffractometry.

The lithium-containing silicon oxide powder particles of the invention may be of any desired shape. That is, the particles may be spherical, ellipsoidal, irregular, fragmental, acicular or tabular.

Now, it is described how to prepare the lithium-containing silicon oxide powder of the invention.

According to the invention, the lithium-containing silicon oxide powder is prepared by heating a mixture of a raw material powder capable of generating SiO gas and metallic lithium or a lithium compound in an inert gas atmosphere or in vacuum at a temperature of 800 to 1,300° C.

The raw material powder capable of generating SiO gas used herein may be silicon oxide (SiO$_z$) powder wherein z is a positive number of 0<z<2 or silicon dioxide powder, to which a reducing powder, that is, a powder capable of reducing the raw material powder is optionally added.

Of the silicon oxide (SiO$_z$) powder and silicon dioxide powder, use of SiO$_z$ powder is preferred because it is easy to control the composition (x and y values) of the inventive lithium-containing silicon oxide powder SiLi$_x$O$_y$.

Although the SiO$_z$ powder used as the raw material is not critical with respect to physical properties or the like, it is preferred that z be in the range: 1.0≦z<1.6, and preferably 1.0≦z<1.3, and the powder have a specific surface area of 1 to 100 m$^2$/g, and preferably 3 to 50 m$^2$/g. A SiO$_z$ powder with z<1.0 may be difficult to produce and rarely available. A SiO$_z$ powder with z≧1.6 may have so low an activity that it is difficult to produce the desired SiLi$_x$O$_y$ powder therefrom in a controlled manner. A SiO$_z$ powder with a specific surface area of less than 1 m$^2$/g may similarly have so low an activity that it is difficult to produce the desired SiLi$_x$O$_y$ powder therefrom in a controlled manner. A SiO$_z$ powder with a specific surface area of more than 100 m$^2$/g may contain a more amount of inactive SiO$_2$ which can impede reaction.

Examples of the reducing powder include metallic silicon compounds and carbon-containing powders. Of these, metallic silicon compounds are preferably used for improved reactivity and increased yields.

On the other hand, the metallic lithium or lithium compound added is not critical. Exemplary lithium compounds are lithium oxide, lithium hydroxide, lithium carbonate, lithium nitrate and lithium silicate and hydrates thereof.

In the starting mixture, the ratio of the raw material powder capable of generating SiO gas to metallic lithium or the lithium compound is preferably set so as to give a molar ratio of lithium atoms to silicon atoms (Li/Si) in the range: 0<Li/Si≦1.0, and more preferably 0.05≦Li/Si≦0.6. Outside the range, it may become difficult to control the composition of the lithium-containing silicon oxide powder produced therefrom, and fusion or partial crystallization of lithium may not take place.

According to the invention, a lithium-containing silicon oxide powder is prepared by heating the starting mixture in an inert gas atmosphere or in vacuum at a temperature of 800 to 1,300° C. for reaction to take place. The inert gas atmosphere used herein is not critical and may be at least one gas of Ar, He, Ne and H$_2$, for example. The reaction temperature is in the range of 800 to 1,300° C. and preferably 900 to 1,200° C. At temperatures below 800° C., little reaction takes place with little progress of crystallization. Temperatures above 1,300° C. induce disproportionation, resulting in a product separating into Si and SiO$_2$ and failing to exert the function of negative electrode material.

The preparation system is not critical and preparation in either a continuous or a batchwise manner is acceptable. Any reactor appropriate to a particular purpose may be selected from among a fluidized bed reaction furnace, rotary furnace, vertical moving bed reaction furnace, tunnel furnace, and batch furnace.

The composition (x and y values) of the inventive lithium-containing silicon oxide powder SiLi$_x$O$_y$ can be controlled by properly selecting the physical properties of SiO$_z$ used as the raw material, the type and amount of metallic lithium or lithium compound, and reaction temperature.

Using the inventive lithium-containing silicon oxide powder as a negative electrode material, a lithium ion secondary cell can be constructed.

The lithium ion secondary cell thus constructed is characterized by the use of the partially crystallized lithium-containing silicon oxide powder as the negative electrode active material while the materials of the positive electrode (positive electrode active material and the like), negative electrode, electrolyte, non-aqueous solvent, and separator and the cell design are not critical. For example, the positive electrode active material used herein may be selected from transition metal oxides such as LiCoO$_2$, LiNiO$_2$, LiMn$_2$O$_4$, V$_2$O$_5$, MnO$_2$, TiS$_2$ and MoS$_2$ and chalcogen compounds. The electrolytes used herein may be lithium salts such as lithium perchlorate in non-aqueous solution form. Examples of the non-aqueous solvent include propylene carbonate, ethylene carbonate, dimethoxyethane, γ-butyrolactone and 2-methyltetrahydrofuran, alone or in admixture. Use may also be made of other various non-aqueous electrolytes and solid electrolytes.

When the inventive lithium-containing silicon oxide powder is used as a negative electrode material, a conductive agent such as graphite may be added to it prior to use. The type of conductive agent used herein is not critical as long as it is an electronically conductive material which does not undergo decomposition or alteration in the cell. Illustrative conductive agents include metals in powder or fiber form such as Al, Ti, Fe, Ni, Cu, Zn, Ag, Sn and Si, natural graphite, synthetic graphite, various coke powders, mesophase carbon, vapor phase grown carbon fibers, pitch base carbon fibers, PAN base carbon fibers, and graphite obtained by firing various resins.

EXAMPLE

Examples of the invention are given below by way of illustration and not by way of limitation.

Example 1

A tray of silicon nitride was charged with 200 g of a mixture of a $SiO_z$ powder (z=1.05, BET specific surface area=33.5 m²/g) and lithium hydroxide hydrate in a weight ratio of 90:10 and placed in a reaction furnace having an effective volume of 15 liters. While flowing argon gas through the furnace at a flow rate of 10 NL/min, reaction was effected at a temperature of 900° C. for 3 hours, obtaining 160 g of a crude lithium-containing silicon oxide powder. The crude powder had a BET specific surface area of 5.8 m²/g.

The crude powder, 100 g, was wet milled in a 2-liter alumina ball mill by using 1,000 g of alumina balls of 5 mm diameter as the milling medium and 500 g of hexane as the solvent and operating at 1 rpm. At the end of milling, the lithium-containing silicon oxide powder had an average particle diameter $D_{50}$ of 4.3 µm, a BET specific surface area of 14.2 m²/g, a lithium content of 1.3 wt %, and an oxygen content of 33.5 wt % and was represented by $SiLi_xO_y$ wherein x=0.08 and y=0.90. On x-ray diffractometry, it was confirmed that lithium had been fused and partially crystallized. The x-ray diffraction chart is shown in FIG. 1.

Using the lithium-containing silicon oxide powder thus obtained as the negative electrode active material, a test lithium ion secondary cell was constructed by the following procedure.

Cell Test

A negative electrode material mixture was obtained by adding synthetic graphite (average particle diameter 5 µm) to the lithium-containing silicon oxide powder obtained above so as to give a carbon content of 40 wt %. Polyvinylidene fluoride was then added to the mixture in a weight ratio of negative electrode material mixture : PVF=9:1. N-methylpyrrolidone was added thereto to form a slurry. The slurry was coated onto a copper foil of 20 µm gage and dried at 120° C. for one hour. Using a roller press, the coated foil was shaped under pressure into an electrode sheet, of which discs of 20 mm diameter were punched out as the negative electrode.

To evaluate the charge/discharge performance of the negative electrode, a test lithium ion secondary cell was constructed using a lithium foil as the counter electrode. The electrolyte solution used was a non-aqueous electrolyte solution of lithium phosphorus hexafluoride in a 1/1 (by volume) mixture of ethylene carbonate and 1,2-dimethoxyethane in a concentration of 1 mol/liter. The separator used was a microporous polyethylene film of 30 µm thick.

The lithium ion secondary cell thus constructed was allowed to stand overnight at room temperature. Using a secondary cell charge/discharge tester (Nagano K. K.), a charge/discharge test was carried out on the cell. Charging was conducted with a constant current flow of 1 mA until the voltage of the test cell reached 0 V, and after reaching 0 V, continued with a reduced current flow so that the cell voltage was kept at 0 V, and terminated when the current flow decreased below 20 µA. Discharging was conducted with a constant current flow of 1 mA and terminated when the cell voltage rose above 1.8 V, from which a discharge capacity was determined.

By repeating the above operations, the charge/discharge test on the cell was carried out 10 cycles. The test results included a first charge capacity of 1,330 mAh/g, a first discharge capacity of 1,150 mAh/g, an efficiency of first charge/discharge cycle of 86.5%, a discharge capacity on the 10th cycle of 1,090 mAh/g, and a cycle retentivity after 10 cycles of 94.8%, indicating that it was a lithium ion secondary cell having a high capacity and an improved first charge/discharge efficiency and cycle performance.

Examples 2–6 & Comparative Examples 1–5

Figure 2:
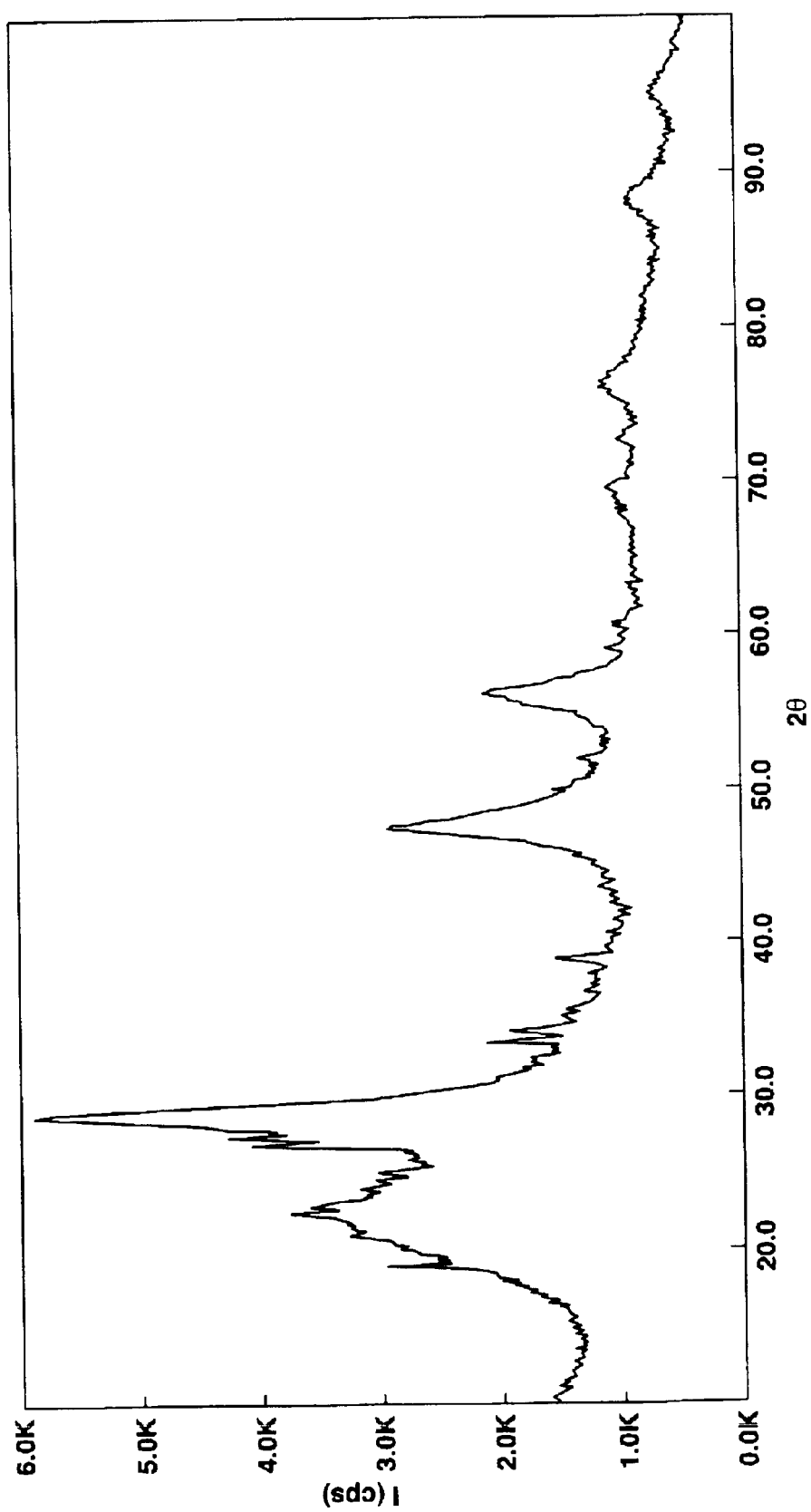
FIG. 2 is an x-ray diffraction chart of a lithium-containing silicon oxide powder (Li crystallization 21.3%) obtained in Example 5.
Figure 3:
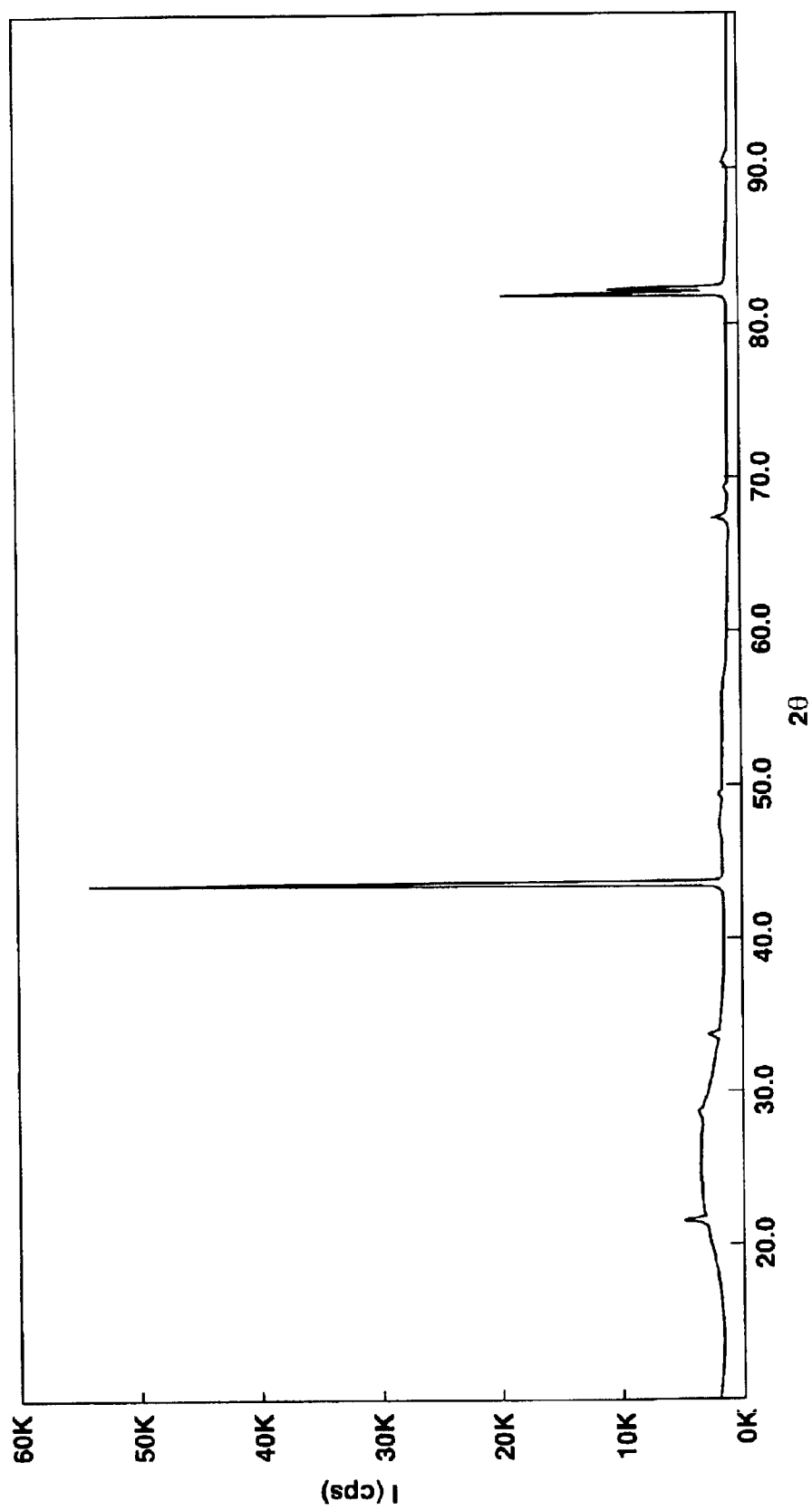
FIG. 3 is an x-ray diffraction chart of a powder (Li crystallization 0%) obtained in Comparative Example 2.

Lithium-containing silicon oxide powders were prepared as in Example 1 except that the raw material $SiO_z$, lithium compound, $SiO_z$/lithium compound ratio and reaction temperature were changed as shown in Table 1. The crude lithium-containing silicon oxide powders obtained were determined for recovery amount and BET specific surface area; and the refined lithium-containing silicon oxide powders were determined for average particle diameter $D_{50}$, BET specific surface area, lithium content and oxygen content. These results are shown in Table 2 together with the composition (x and y values in the formula $SiLi_xO_y$) calculated from the lithium and oxygen contents. By x-ray diffractometry, it was examined whether or not amorphous lithium silicon oxide and crystalline lithium silicon oxide were present. The results are shown in Table 2. FIGS. 2 and 3 are X-ray diffraction charts of the (lithium-containing silicon oxide) powders obtained in Example 5 and Comparative Example 2, respectively.

It is seen from FIGS. 1 to 3 that lithium had been fused and partially crystallized in the lithium-containing silicon oxide powders of Examples 1 and 5 whereas neither fusion nor partial crystallization of lithium had took place in the silicon oxide powder of Comparative Example 2.

As in Example 1, test lithium ion secondary cells were fabricated using the above-prepared lithium-containing silicon oxide powders and tested. It is noted that Comparative Example 1 used the raw material, silicon oxide powder ($SiO_z$) without treatment. The results are shown in Table 3.

TABLE 1

| | Reaction conditions | | | |
|---|---|---|---|---|
| | Raw material $SiO_z$ | | | $SiO_z$/ |
| | z | BET specific surface area (m²/g) | Temperature (° C.) | Lithium compound | lithium compound weight ratio (wt/wt) |
| Example 1 | 1.05 | 33.5 | 900 | $LiOH.H_2O$ | 90/10 |
| Example 2 | 1.05 | 33.5 | 900 | $LiOH.H_2O$ | 80/20 |
| Example 3 | 1.05 | 33.5 | 900 | $LiOH.H_2O$ | 50/50 |
| Example 4 | 1.05 | 33.5 | 900 | $Li_2O$ | 90/10 |
| Example 5 | 1.05 | 33.5 | 1000 | $LiOH.H_2O$ | 80/20 |
| Example 6 | 1.05 | 33.5 | 1200 | $LiOH.H_2O$ | 80/20 |
| Comparative Example 1 | 1.05 | 33.5 | — | — | — |
| Comparative Example 2 | 1.05 | 33.5 | 700 | $LiOH.H_2O$ | 80/20 |
| Comparative Example 3 | 1.05 | 33.5 | 1400 | $LiOH.H_2O$ | 80/20 |
| Comparative Example 4 | 1.05 | 33.5 | 900 | $LiOH.H_2O$ | 20/80 |
| Comparative Example 5 | 1.70 | 63.2 | 900 | $LiOH.H_2O$ | 80/20 |

TABLE 2

| | Crude powder | | Li-containing silicon oxide powder | | | | | | | |
|---|---|---|---|---|---|---|---|---|---|---|
| | Recovery amount | BET specific surface area | Li content | O content | SiLi$_x$O$_y$ | | BET specific surface area | Average particle diameter D$_{50}$ | Fusion and partial crystal-lization | Crystal-lization of lithium |
| | (g) | (m$^2$/g) | (wt %) | (wt %) | x | y | (m$^2$/g) | (μm) | of lithium | (%) |
| Example | | | | | | | | | | |
| 1 | 160 | 5.8 | 1.3 | 33.5 | 0.08 | 0.90 | 14.2 | 4.3 | present | 8.3 |
| 2 | 150 | 6.2 | 3.1 | 35.1 | 0.20 | 0.99 | 14.3 | 4.2 | present | 9.2 |
| 3 | 145 | 6.7 | 7.6 | 36.4 | 0.54 | 1.14 | 15.0 | 4.2 | present | 12.6 |
| 4 | 155 | 6.1 | 4.7 | 38.1 | 0.33 | 1.17 | 13.9 | 4.1 | present | 10.5 |
| 5 | 140 | 5.1 | 2.6 | 34.2 | 0.16 | 0.95 | 13.2 | 4.5 | present | 21.3 |
| 6 | 135 | 3.2 | 2.3 | 30.5 | 0.14 | 0.79 | 8.9 | 5.3 | present | 29.5 |
| Comparative Example | | | | | | | | | | |
| 1 | — | — | — | — | — | — | — | — | — | — |
| 2 | 195 | 30.4 | 3.3 | 39.6 | — | — | 58.3 | 4.3 | absent | 0 |
| 3 | 120 | 0.6 | 1.4 | 30.3 | — | — | 3.5 | 5.8 | present | 62.5 |
| 4 | 145 | 8.7 | 13.5 | 35.4 | 1.04 | 1.16 | 30.5 | 4.5 | present | 17.5 |
| 5 | 155 | 15.8 | 3.1 | 46.2 | 0.24 | 1.59 | 65.1 | 4.1 | present | 7.0 |

In Comparative Example 2, the raw material, lithium hydroxide hydrate was left, and neither fusion of lithium (formation of lithium silicon oxide) nor partial crystallization of lithium silicon oxide took place.

In Comparative Example 3, the raw material, silicon oxide underwent disproportionation reaction with the result of SiO$_2$ precipitating on the surface, failing to produce the desired lithium silicon oxide.

TABLE 3

| | 1st charge capacity (mAh/g) | 1st discharge capacity (mAh/g) | 1st charge/ discharge efficiency (%) | Discharge capacity after 10 cycles (mAh/g) | Capacity retentivity after 10 cycles (%) |
|---|---|---|---|---|---|
| Example 1 | 1330 | 1150 | 86.5 | 1090 | 94.8 |
| Example 2 | 1240 | 1120 | 90.3 | 1060 | 94.6 |
| Example 3 | 1050 | 980 | 93.3 | 930 | 94.9 |
| Example 4 | 1210 | 1120 | 92.6 | 1060 | 94.6 |
| Example 5 | 1260 | 1130 | 89.7 | 1080 | 95.6 |
| Example 6 | 1270 | 1150 | 90.6 | 1110 | 96.5 |
| Comparative Example 1 | 1510 | 1160 | 76.8 | 780 | 67.2 |
| Comparative Example 2 | 1200 | 930 | 77.5 | 510 | 54.8 |
| Comparative Example 3 | 210 | 190 | 90.5 | 180 | 94.7 |
| Comparative Example 4 | 430 | 380 | 88.4 | 270 | 71.1 |
| Comparative Example 5 | 360 | 320 | 88.9 | 300 | 93.8 |

It is thus evident that using the lithium-containing silicon oxide powder according to the invention as a negative electrode material, a lithium ion secondary cell having a high capacity, improved first charge/discharge efficiency and improved cycle performance is obtainable.

Japanese Patent Application No. 2001-299837 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A lithium-containing silicon oxide powder having the general formula: SiLi$_x$O$_y$, wherein x and y are 0<x<1.0 and 0<y<1.5, the lithium being fused and partially crystallized.

2. The lithium-containing silicon oxide powder of claim 1 having a specific surface area of 0.5 to 50 m$^2$/g.

3. The lithium-containing silicon oxide powder of claim 1 which is used as a negative electrode active material in a lithium ion secondary cell.

4. A method for preparing a lithium-containing silicon oxide powder, comprising the step of heating a mixture of a raw material powder capable of generating SiO gas and metallic lithium or a lithium compound in an inert gas atmosphere or in vacuum at a temperature of 900 to 1,300° C. for reaction.

5. The method of claim 4 wherein the raw material powder capable of generating SiO gas is a SiO$_z$ powder wherein 0<z<2.

6. The method of claim 5 wherein the SiO$_z$ powder wherein 1.0≦z<1.6 has a specific surface area of 1 to 100 m$^2$/g.

7. The lithium-contained silicon oxide powder of claim 1 wherein the proportion of crystallized lithium relative to the entire lithium fused is in the range of 5 to 50%.

8. The lithium-contained silicon oxide powder having the general formula: SiLi$_x$O$_y$, wherein x and y are 0.05<x<0.6 and 0.3<y<1.0, the lithium being fused and partially crystallized.

9. The lithium-contained silicon oxide powder of claim 1 wherein the silicon oxide is doped with lithium to form lithium silicon oxide.

10. The method of claim 4 wherein the lithium compound is selected from the group consisting of lithium oxide, lithium hydroxide, lithium carbonate, lithium nitrate, lithium silicate and hydrates thereof.

11. The method of claim 4 wherein the inert gas is selected from the group consisting of: Ar, He, Ne, H$_2$, and mixtures thereof.

* * * * *